April 16, 1946.  W. L. KEEHN  2,398,532
RIVET
Filed Aug. 13, 1943
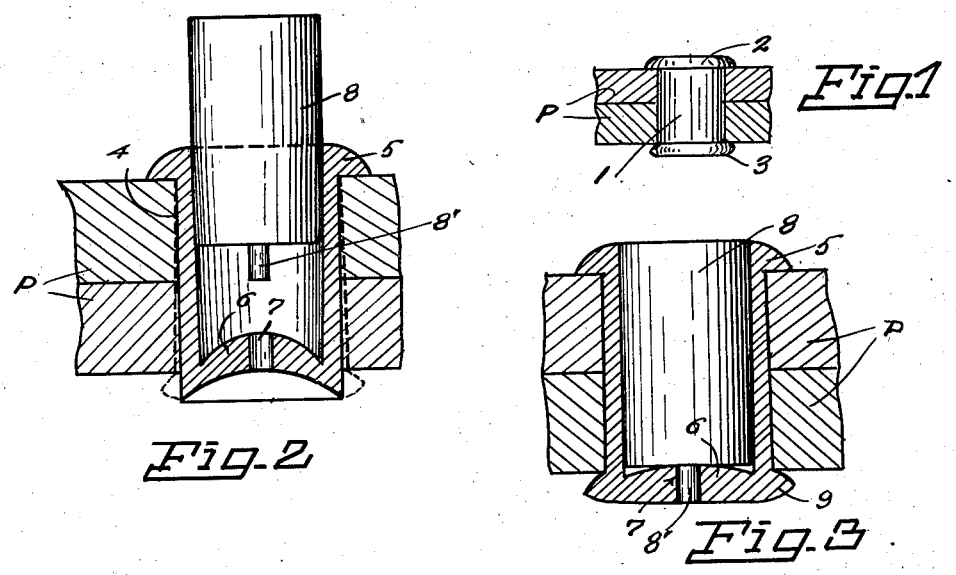
Inventor
Warner L. Keehn
By
Attorney Patented Apr. 16, 1946

2,398,532

UNITED STATES PATENT OFFICE 2,398,532

RIVET

Warner L. Keehn, Spokane, Wash.

Application August 13, 1943, Serial No. 498,483

4 Claims. (Cl. 85—40)

This invention relates to rivets of the type known as blind rivets and it is one object of the invention to provide a rivet having a hollow body or shell and a plunger fitting therein, means being provided for expanding the inner end portion of the shell and forming an inner head for the rivet after the rivet has been passed through openings in plates to be secured against each other.

Another object of the invention is to so form the shell that as the plunger is driven into the shell and the inner end portion of the shell is expanded to form a head, binding action will take place between the shell and plunger and the plunger prevented from slipping out of the shell.

Another object of the invention is to provide a rivet which may be easily passed through openings in the plates and the inner head formed without backing up the inner end of the rivet. It will thus be seen that the improved rivets may be used in airplane construction for securing wing plates and in other places where it is impossible or at least very difficult to have access to the inner end of a rivet.

In the accompanying drawing:

Fig. 1 is a view showing a rivet of the improved construction passed through registering openings in plates and headed at its inner end.

Fig. 2 is a sectional view taken longitudinally through the improved rivet when first inserted.

Fig. 3 is a view similar to Fig. 2 showing the plunger driven into the shell and a head formed thereby at the inner end of the shell.

The improved rivet 1 which is constructed as shown in Figs. 2 and 3 is passed through registering openings formed in plates P so that when a head is formed at the inner end of the rivet, the plates will be firmly clamped against each other between the head 2 at the outer end of the rivet and an inner head 3 formed by expanding the inner end of the rivet.

In Figs. 2 and 3, the rivet has a shell or hollow body 4 which is of even external diameter throughout its length so that it may be passed inwardly through the registering openings formed in the plates until the annular flange 5 at the outer end of the shell fits closely against the outer plate. The walls of the shell gradually increase in thickness toward the inner end thereof so that the shell has an interior taper toward its inner end which is closed by a head 6 of concavo-convex formation, the convex face of the head being presented inwardly of the shell. The concave outer face of the head 6 constitutes an arc of a circle of greater diameter than the convex inner surface of the head and through the center of the head is formed an opening 7. The shell or hollow body is to be expanded in order to clamp the plates against each other and to do this there has been provided a plunger 8 which is of the same length as the interior of the shell and of a diameter corresponding to the diameter of the outer end of the interior of the shell. Therefore, the plunger may be readily fitted into the outer end of the shell after the shell has been passed through the openings of the plates. In view of the fact that the shell has an interior taper toward its inner end, the plunger must be driven into the shell in order to assume the position shown in Fig. 3. As the plunger is driven inwardly it expands the shell radially and a tight wedging fit is established between the shell and plates as well as wedging fit being established between the plunger and the walls of the shell. A pin 8', which projects from the center of the inner end of the plunger, engages in the opening 7 as the plunger is driven inwardly and is firmly gripped by the head 6. In view of the fact that the shell is expanded as the plunger is driven inwardly and is firmly gripped by portions of the plates P forming walls of the openings through which the shell passes, the shell will be prevented from being elongated by driving force when the inner end of the plunger makes contact with the convex inner face of the head 6. The force of blows delivered by the plunger against the inner surface of the head 6 causes this head to be radially expanded and flattened and eventually an outstanding flange 9 will be formed about the inner end of the shell. Since the bottom of the shell has its upper and lower surfaces formed on the arcs shown, it increases in thickness toward its center and is thus strengthened so that the force of the blows delivered at the center of the bottom will cause the bottom to be expanded radially instead of merely bulging the bottom outwardly. Therefore, the bottom will be fully expanded and equally extended throughout its circumference to form the flange 9. The flanges 5 and 9 constitute the inner and outer heads of the rivet and since the plunger serves to reinforce the shell as well as cause the flange 9 to be formed, the rivet in its final state will be very strong. As the outer end of the plunger is flush with the outer end of the shell when driven into place, it cannot be pried loose and as the shell has gripping engagement with the plunger and the pin 8', the plunger will not slip outwardly.

Having thus described the invention, what is claimed is:

1. A rivet comprising a hollow cylindrical body having an outstanding flange about its open outer end, a head for the inner end of said body, a plunger fitted into said body through the outer end thereof, said body being of an even external diameter throughout its length and having its walls inwardly thickened toward the inner end of the body to form an inwardly tapered pocket in the body, said plunger being of an even diameter throughout its length and when driven inwardly having wedging engagement with walls of the body to expand the body radially for gripping engagement with walls of openings in plates through which the body passes and preventing elongation of the body, said head having a convex inner face and a concave outer face constituting an arc of a circle of greater diameter than the circle of which the convex inner surface forms a portion, and said plunger when driven inwardly engaging the center of the convex inner face of said head and expanding the head radially to form an outstanding flange at the inner end of the body for cooperating with the flange about the outer end of the body to hold plates firmly clamped against each other between the flanges.

2. A rivet comprising a hollow cylindrical body open at its outer end and having a head at its inner end, a flange about the open outer end of said body, said head having a convex inner face and a concave outer face and being formed with an opening through its center, the convex inner surface of the head constituting an arc of a circle of less diameter than the concave outer surface and causing the head to be of increased thickness toward its center, a plunger fitted into said body through the open outer end thereof, and a pin at the inner end of said plunger fitting into the opening of said head and gripped by walls thereof when the plunger is driven inwardly, said plunger when driven inwardly contacting the convex inner face of said head and expanding the head radially to form an outstanding flange for cooperating with the flange at the outer end of the body and clamping objects through which the rivet extends firmly against each other.

3. A rivet comprising a hollow cylindrical body open at its outer end and having a head at its inner end, a flange about the open outer end of said body, said head having a convex inner face and a concave outer face constituting an arc of a circle of greater diameter than the circle of which the convex inner face forms an arc whereby the head is inwardly increased in thickness toward its center, and a plunger fitted into the body through the open outer end thereof and driven inwardly therein with its inner end having striking contact with the central portion of the convex inner face of the head to radially expand the head and form an outstanding flange for cooperating with the flange about the outer end of the body and clamping objects through which the rivet passes firmly against each other.

4. A rivet comprising a hollow cylindrical body open at its outer end and having a head at its inner end, a flange about the open outer end of said body, said head having a convex inner face and a concave outer face, said body having its walls inwardly thickened toward its inner end to form an inwardly tapered pocket in the body, and a plunger fitted into said body through the open outer end thereof and driven into the pocket, said plunger having wedging engagement with walls of the pocket to expand the body radially into tight fitting engagement with walls of openings in objects through which the rivet passes and prevent longitudinal extension of the body, and said plunger when driven inwardly having its inner end contacting the center of the convex inner face of said head and radially expanding the head to form an outstanding flange for cooperating with the flange about the outer end of the body and clamping objects through which the rivet passes firmly against each other.

WARNER L. KEEHN.